(12) United States Patent
Block et al.

(10) Patent No.: US 8,051,533 B2
(45) Date of Patent: Nov. 8, 2011

(54) DOUBLE ROLLER WITH TWO RUNNING WHEELS AND ROLLER WITH ONE RUNNING WHEEL

(75) Inventors: Wolfgang Block, Wermelskirchen (DE); Uwe Harksen, Wermelskirchen (DE)

(73) Assignee: TENTE GmbH & Co. KG, Wermelskirchen (DE)

(*) Notice: Subject to any disclaimer, the term of this patent is extended or adjusted under 35 U.S.C. 154(b) by 312 days.

(21) Appl. No.: 12/312,262

(22) PCT Filed: Oct. 31, 2007

(86) PCT No.: PCT/EP2007/061742
§ 371 (c)(1), (2), (4) Date: May 1, 2009

(87) PCT Pub. No.: WO2008/055831
PCT Pub. Date: May 15, 2008

(65) Prior Publication Data
US 2010/0077562 A1    Apr. 1, 2010

(30) Foreign Application Priority Data

Nov. 7, 2006  (DE) .................. 10 2006 052 680
Aug. 20, 2007 (DE) .................. 10 2007 039 208

(51) Int. Cl.
*B60B 33/06* (2006.01)
(52) U.S. Cl. .................................. 16/35 R; 16/47
(58) Field of Classification Search ............. 16/35 R, 16/35 D, 47, 48, 44, 18 CG; 188/1.12; 5/86.1, 5/600; 280/47.11
See application file for complete search history.

(56) References Cited

U.S. PATENT DOCUMENTS

| | | | | |
|---|---|---|---|---|
| 3,801,129 A | * | 4/1974 | Kotzin, Jr. ................. | 280/855 |
| 4,677,706 A | * | 7/1987 | Screen ................. | 16/35 R |
| 4,706,329 A | * | 11/1987 | Screen ................. | 16/47 |
| 5,014,391 A | * | 5/1991 | Schulte ................. | 16/35 R |
| 5,133,106 A | | 7/1992 | Milbredt et al. | |

(Continued)

FOREIGN PATENT DOCUMENTS
DE    89 15 173    4/1991
(Continued)

OTHER PUBLICATIONS
International Search Report.

*Primary Examiner* — Chuck Y. Mah
(74) *Attorney, Agent, or Firm* — Collard & Roe, P.C.

(57) ABSTRACT

The invention relates to a double roller (1) with two running wheels (2) and one carrier housing (3), wherein an assembly journal (6) is arranged on the carrier housing (3). An actuating tappet (15) can be displaced in the assembly journal against a spring force, interacting with a counter locking part (65) for directional and/or complete fixation. Furthermore, a running wheel braking part (25) with engaging parts (37, 38) is provided for blocking the rotation of the running wheels (2). The running wheel braking part (25) is likewise actuated by the actuating tappet (15) and furthermore the housing section (4) accommodating the actuating tappet (15) includes a ball bearing (8) on the upper side and surrounds the actuating tappet (15) at least partially toward the bottom. In order to enhance a double roller of this type, it is proposed to have the counter locking part (65) inserted underneath the ball bearing (9) in the part of the housing section (4) that opens only in regard to the inner opening.

31 Claims, 12 Drawing Sheets

U.S. PATENT DOCUMENTS

| | | | |
|---|---|---|---|
| 5,139,116 A * | 8/1992 | Screen | 188/1.12 |
| 5,275,472 A * | 1/1994 | Hicks | 301/105.1 |
| 5,303,450 A * | 4/1994 | Lange | 16/35 D |
| 5,774,936 A * | 7/1998 | Vetter | 16/35 R |
| 6,360,851 B1 * | 3/2002 | Yang | 188/1.12 |
| 6,367,885 B1 * | 4/2002 | Denner et al. | 301/105.1 |
| 6,584,641 B1 | 7/2003 | Milbredt | |
| 2005/0120514 A1 * | 6/2005 | Donakowski | 16/45 |
| 2007/0289098 A1 * | 12/2007 | Tsai | 16/35 R |

FOREIGN PATENT DOCUMENTS

| | | |
|---|---|---|
| DE | 42 22 728 | 1/1994 |
| DE | 200 16 429 | 12/2000 |
| EP | 0 379 065 | 7/1990 |
| EP | 1 527 906 | 5/2005 |
| GB | 2 240 471 | 8/1991 |
| WO | WO 01/14153 | 3/2001 |

* cited by examiner

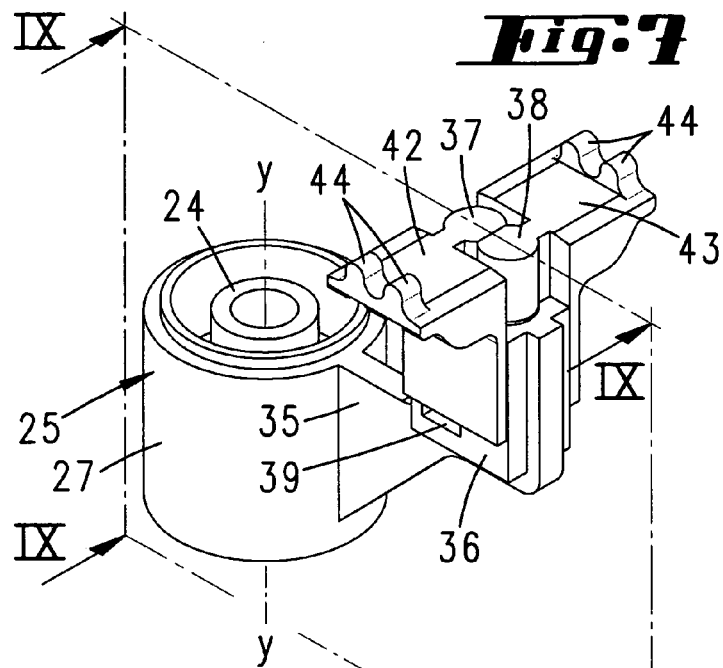
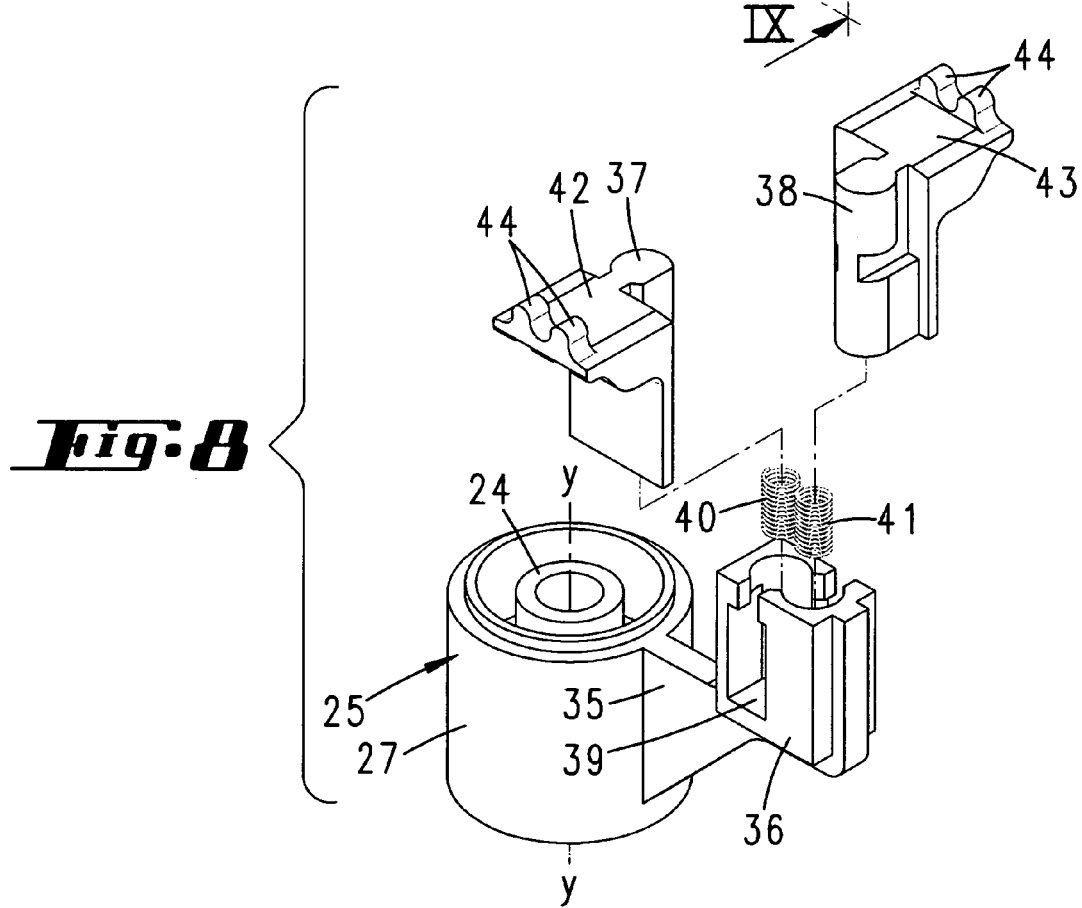

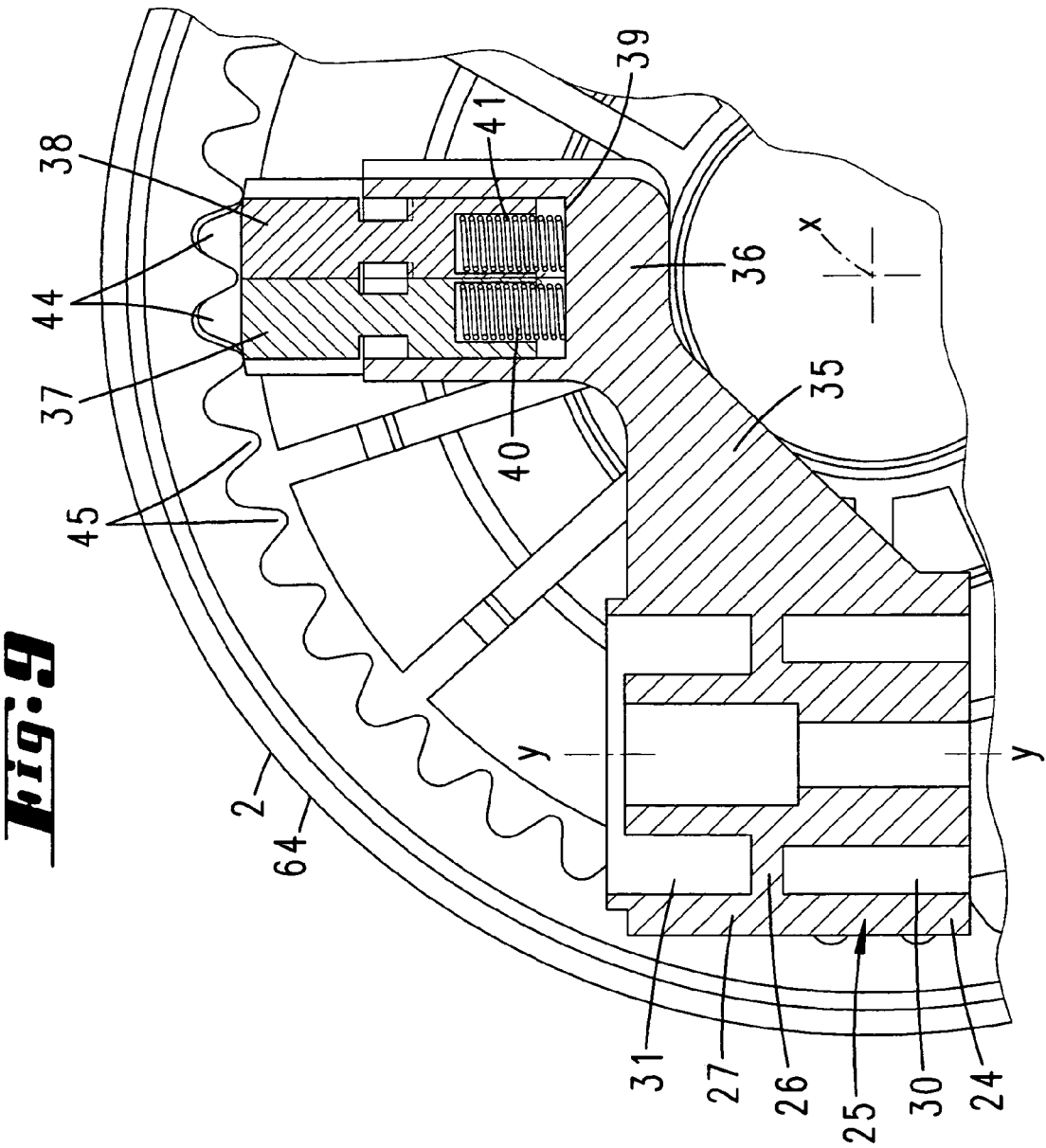

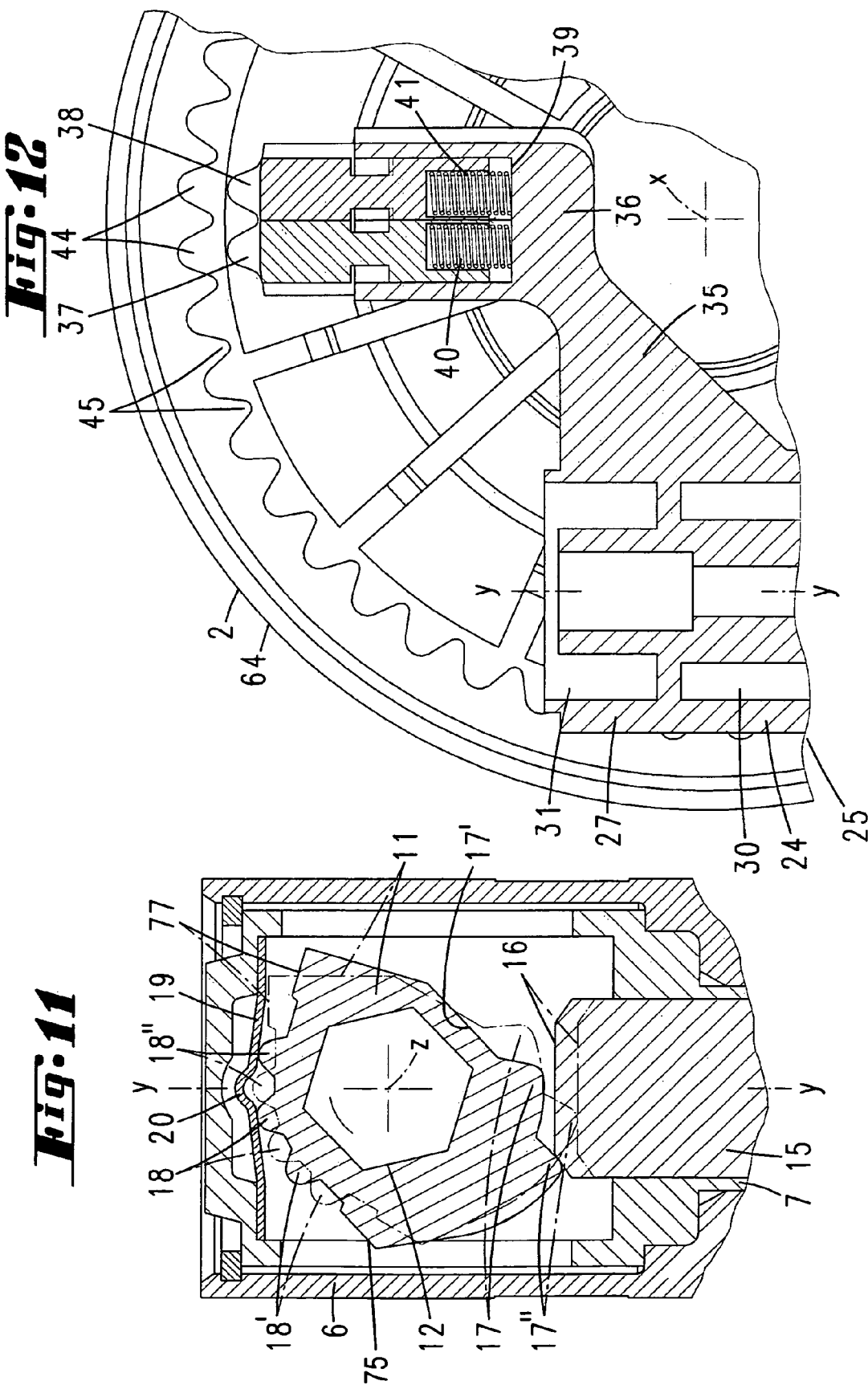

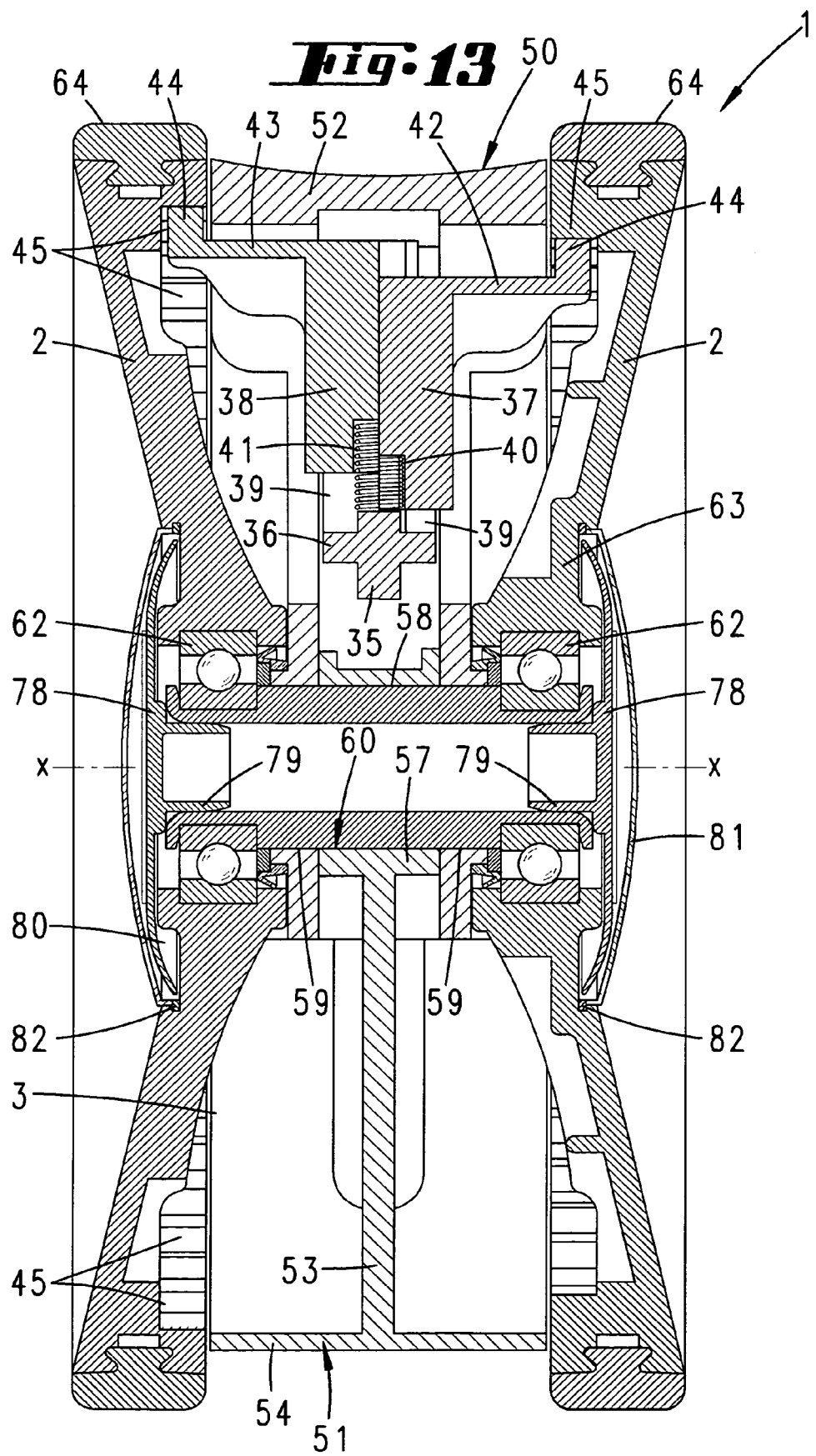

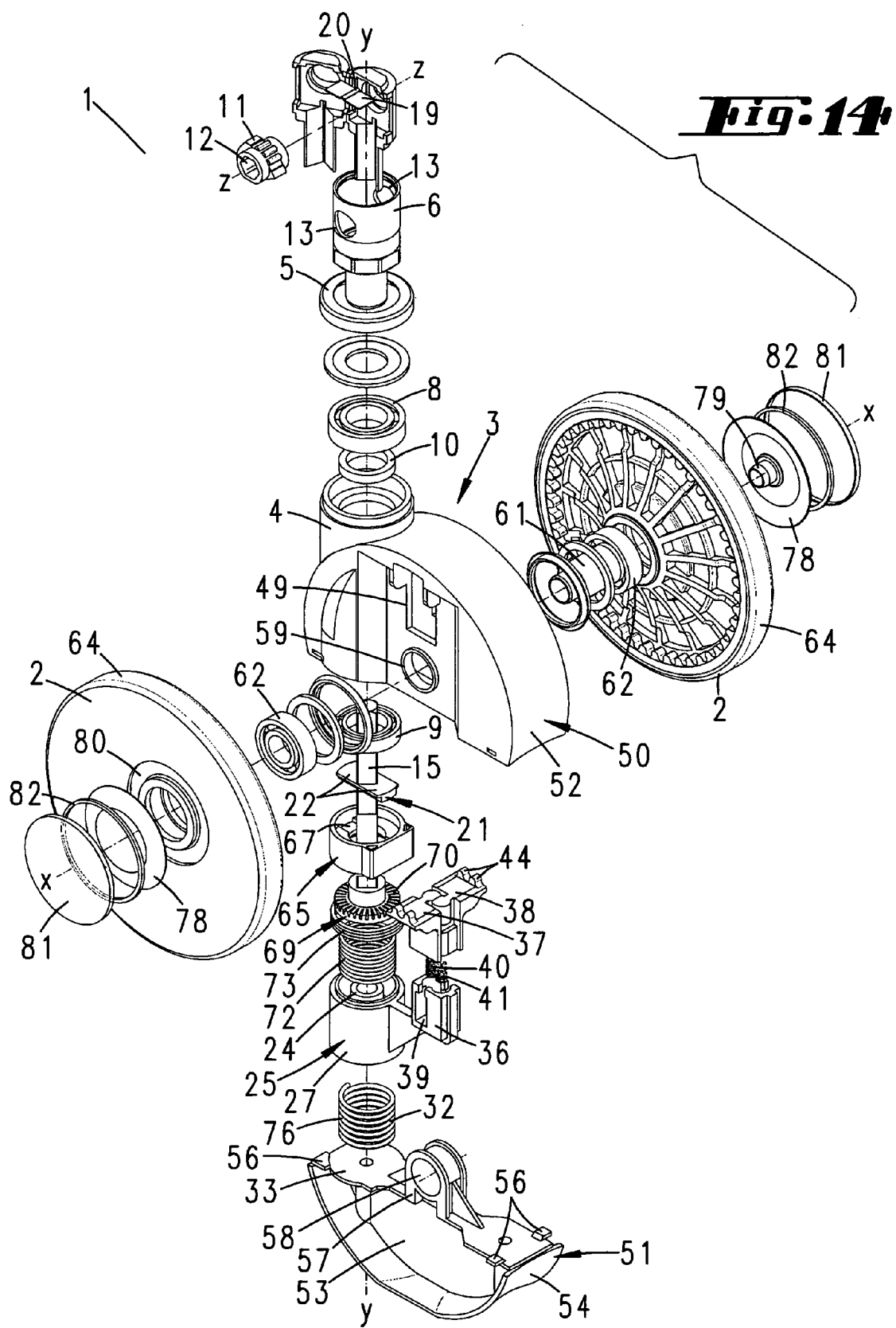

DOUBLE ROLLER WITH TWO RUNNING WHEELS AND ROLLER WITH ONE RUNNING WHEEL

CROSS REFERENCE TO RELATED APPLICATIONS

This application is the National Stage of PCT/EP2007/061742 filed on Oct. 31, 2007, which claims priority under 35 U.S.C. §119 of German Application No. 10 2006 052 680.5 filed on Nov. 7, 2006 and German Application No. 10 2007 039 208.9 filed on Aug. 20, 2007. The international application under PCT article 21(2) was not published in English.

The invention relates, in first instance, to a double roller with two running wheels and a carrying housing, it being the case that the carrying housing has formed on it a mounting pin in which an actuating push rod can be displaced counter to spring force and interacts with a locking counter-part for directional and/or full locking, and that, in addition, a running-wheel braking part with engagement parts is provided, for rotational blocking of the running wheels, which running-wheel braking part is likewise actuated by the actuating push rod, and that, furthermore, the housing portion which accommodates the actuating push rod has a ball bearing on the upper side and at least partially encloses the actuating push rod in the downward direction.

Double rollers of the type in question are known. These are used, for example, on hospital beds, furniture or the like, a positively locking connection being achieved between the double roller and, for example, the hospital bed via the mounting pin on the carrying housing. An adjusting tool or the like is used to act on the actuating push rod accommodated in the region of the mounting pin, in order to displace this push rod in the axial direction. The actuating push rod can be used to change from a neutral position, in which the double roller acts as a swiveling caster, into a fixed-caster position, in which the double roller is secured in a specifically directed pivoting position. In this position, the running wheels continue to be freely rotatable. In a further actuating position of the push rod, it is possible to assume a full-locking position, which can be achieved irrespective of the pivoting position assumed by the double roller and in which, at the same time, the running wheels are blocked in the direction of rotation.

In respect of the prior art described above, it is a technical problem of the invention for a double roller of the type in question, with an easy-to-install configuration, to be improved in an advantageous manner.

This problem is solved first and foremost by the subject matter of claim 1, this being based on the fact that the locking counter-part is located beneath the ball bearing, in the housing portion which is only open internally. The locking counter-part is accordingly not a constituent part of the actuating push rod or is not connected thereto for movement. Rather, the locking counter-part is preferably disposed, such that it encloses the actuating push rod, in the internal housing opening for interaction with the push rod, and furthermore such that it cannot be moved preferably at least axially out of a basic position. This locking counter-part also serves both for directional locking and for full locking of the double roller. This configuration achieves a reduction in overall height of the carrying-housing portion which encloses the actuating push rod. Furthermore, the housing portion which is only open internally in the downward direction facilitates installation, in particular initial installation, of the double-roller internal parts, such as the actuating push rod, locking counter-part or also the running-wheel braking part and springs provided. This makes it possible for these internal parts to be inserted into the carrying housing only from one side, namely from beneath.

Also described are features which are important preferably in combination with the features of claim 1 but, in principle, may also be important with only some of the features of claim 1 or on their own.

Thus, a development of the subject matter of the invention provides that the locking counter-part is supported in the upward direction by a housing shoulder, irrespective of the pivoting-blocking position. Accordingly, the locking counter-part preferably constitutes an axially displaceable insert part which, in a basic position, is located in the housing portion with stop limiting in the axially upward direction, this allowing axial movement in the downward direction out of the basic position. It is also proposed that the actuating push rod is supported radially in the housing beneath the locking counter-part only by means of the running-wheel braking part. As a result of this configuration, the actuating push rod can be reduced to an effective minimum, as seen in the axial direction. The push-rod portion engaging with the running-wheel braking part is supported radially, at the same time, by the running-wheel braking part. Accordingly, there is no need for any further radial support of the push rod by a housing portion, in particular any housing portion still beneath the running-wheel braking part. This also contributes to a reduction in overall height. The running-wheel braking part is itself preferably guided, i.e. supported radially, in the housing portion which is only open internally.

It is also preferred if the actuating push rod is biased into its uppermost position via a push-rod spring, it also being the case that preferably in the region of the upper end, directed away from the push-rod spring, the actuating push rod interacts with a control cam, for adjusting the different axial positions of the actuating push rod. The uppermost position of the actuating push rod here corresponds to the engagement position of the engagement parts, i.e. in particular the engagement parts for securing the rotation of the running wheels, but also preferably the parts for securing pivoting, so that the uppermost position of the actuating push rod corresponds to the full-locking position of the double roller. As a result, the push-rod spring, which constitutes an adjusting spring, always tries to force the actuating push rod into the full-locking position. In a preferred configuration, this push-rod spring is supported, on the one hand, on the housing and, on the other hand, on the running-wheel braking part, via which the spring force acts on the actuating push rod. The push-rod spring always adjusts the running-wheel braking part in accordance with the push-rod position. Accordingly, the push-rod spring, by direct action, always forces the running-wheel braking part in the direction of rotational blocking of the running wheel. Such rotational blocking can be released only against the force of the push-rod spring.

Increased tilting stability of the actuating push rod is achieved by the arrangement of two ball bearings which are provided one beneath the other, both being positioned above the locking counter-part, further preferably in the region of an upper end of the carrying-housing portion which accommodates the actuating push rod, this end being adjoined by the mounting pin. The two ball bearings are spaced apart axially from one another approximately by the thickness of the bearing, as seen in the axial direction, these two ball bearings, in addition, having different external diameters. Thus, for example, the axially inner ball bearing has a smaller external diameter than the axially outer ball bearing.

For full locking, the locking counter-part interacts with a pivoting-blocking part, it being possible for the locking counter-part and the pivoting-blocking part to be moved axially independently of one another. The pivoting-blocking part is moved via the actuating push rod for interaction with the locking counter-part, it also being possible for the pivoting-blocking part to be displaced axially relative to the actuating push rod. This is achieved by a spring which acts on the pivoting-blocking part and also acts in the same direction as the push-rod spring. It is thus also provided that the locking counter-part and the pivoting-blocking part are subjected to loading in each case by a dedicated spring, a first biasing spring and a second biasing spring, which two biasing springs act in the same direction as the push-rod spring, that is to say, in relation to the orientation of the actuating push rod, in the upward direction, it being the case that the first biasing spring biases the locking counter-part against the housing shoulder and the second biasing spring biasing the pivoting-blocking part, with stop limiting, against the actuating push rod. For a further reduction in overall height, the first and second biasing springs are disposed concentrically in relation to one another, each enclosing a bottom portion of the actuating push rod in the process. The two biasing springs are supported in this way, in the direction away from the locking counter-part and/or pivoting-blocking part, on the running-wheel braking part, specifically on that side of the running-wheel braking part which is directed away from the push-rod spring. The second biasing spring, which acts on the pivoting-blocking part, preferably has a diameter corresponding to the push-rod spring. In contrast, the first biasing spring has a larger diameter.

In addition, for directional locking (fixed-caster position), the locking counter-part interacts with a directional-locking part, it being possible for the locking counter-part and the directional-locking part to be moved axially independently of one another. In the position in which the locking counter-part and directional-locking part interact, the double roller performs the function of a fixed caster. The directional-locking part here is formed on the actuating push rod, and additionally is arrested thereon in terms of movement, it being the case that, in a development of the subject matter of the invention, this directional-locking part, at the same time, provides stop limiting for the pivoting-blocking part in the axial direction. Accordingly, the pivoting-blocking part is carried along, via the directional-locking part, when the actuating push rod is lowered counter to spring action, this taking place with the pivoting-blocking part and directional-locking part still being capable of axial movement independently of one another.

In addition, preferably centrally in relation to the actuating push rod, the running-wheel braking part has an adjusting screw. The latter allows the running-wheel braking part to be adjusted axially relative to the actuating push rod. This adjusting screw is further preferably accessible from beneath, from the abovedescribed installation side of the double roller, for which purpose the housing has a corresponding access opening.

The invention also relates to a double roller with two running wheels and a carrying housing which extends between the running wheels, is closed the upward direction and has the running-wheel axis passing through it, it being the case that, in addition, the carrying housing has formed on it a mounting pin in which an actuating push rod can be displaced counter to spring force.

Such double rollers, as mentioned in the introduction, are known.

In respect of the known prior art, it is a technical problem of the invention to configure a double roller of the type in question such that it has improved installation properties.

This problem is solved first and foremost by the subject matter of claim 17, this being based on the fact that the carrying housing is divided horizontally, the division being formed beneath the running-wheel axis. This results in a lower carrying-housing part and an upper carrying-housing part, preferably all the working parts, for example the actuating push rod and any blocking parts which may be provided in addition, being inserted in the upper carrying-housing part. Once the internal parts have been inserted, the housing is closed by virtue of the lower carrying-housing part being placed in position, this lower carrying-housing part, finally, possibly also being secured. A latching connection between the lower part and upper part is preferred in this respect. As a result of the housing being divided as proposed, the internal parts can be inserted into the upper carrying-housing part solely from beneath, by way of a final installation opening which is covered over by the lower part.

Also described are features which are important preferably in combination with the features of claim 17 but, in principle, may also be important with only some of the features of claim 17 or on their own.

Thus, a development of the subject matter of the invention provides that the housing parts engage one inside the other in the region of the running-wheel axis. It is thus provided that each housing part forms part of the running-wheel hub. It is possible to achieve a positively locking plug-in connection between the housing parts via the axle body for the two running wheels.

In a preferred configuration, the upper housing part is closed laterally in the direction of the running wheels, with the exception of a through-passage for rotational-blocking engagement parts which are acted upon from the housing-interior and act on the running wheels disposed on both sides of the upper housing part. Furthermore, the upper housing part contains chambers, and accordingly forms one or more cavities for accommodating the actuating push rod and possibly further internal parts, thus, in particular, for accommodating the parts which act on the rotational-blocking engagement parts. As a result of the upper housing part being closed laterally to the greatest extent, these parts are afforded a protected position. The two side parts of the upper housing part are in the form of plate portions and are spaced-apart from one another in relation to the running-wheel axis, the upper housing part also being closed, circumferentially, such that the two side parts are connected.

In contrast, with the exception of through-holes, the lower housing part is free of chambers, and accordingly forms in the center, as seen in the direction in which the running-wheel axis extends, a carrier which is in the form of a circular-disk portion and around the circumference of which is positioned a lateral wall, the width of which, measured in the direction in which the running-wheel axis extends, corresponds to that of circumferential lateral surface of the upper housing part. In the direction toward the upper housing part, the disk-portion carrier carries a base which extends in the separating plane and is intended for closing the chambers in the upper housing part.

The lower part is preferably provided with two through-holes which, starting from the base of the lower housing part, extend downward transversely to the running-wheel axis, one of these through-holes being aligned with an adjusting screw associated with the actuating push rod, and accordingly being aligned with the axis of the actuating push rod. This makes it possible for the adjusting screw to be adjusted through the through-opening from the underside of the wheel.

The actuating push rod and, if appropriate, a running-wheel braking part and/or a directional-locking or full-locking means are preferably formed only in the upper housing part. It is thus easier for these internal parts to be fitted since, with the housing parts separated, they can be inserted extremely easily from beneath into the associated chambers of the upper housing part, whereupon the chambers are closed by virtue of the lower housing part being placed in position. In this respect, it is also provided that the actuating push rod is biased into its uppermost position by a push-rod spring, and the push-rod spring rests on the base formed on the lower housing part. In respect of the locking/blocking elements, the housing part is preferably subjected to loading only by the push-rod spring. Accordingly, the lower housing part, rather than just forming a closure for the chambers in the upper housing part, also provides the support for the functionally necessary push-rod spring.

The invention also relates to a double roller with two running wheels and a carrying housing, it being the case that the carrying housing has formed on it a mounting pin in which an actuating push rod can be displaced counter to spring force and interacts with a locking counter-part for directional and/ or full locking, and that, in addition, a running-wheel braking part with engagement parts is provided, for rotational blocking of the running wheels, which running-wheel braking part is likewise actuated by the actuating push rod.

Such double rollers are known.

In order for a double roller of the type in question to be improved further, it is proposed that the running-wheel braking part is forced against the actuating push rod merely by spring force which is applied by an adjusting spring, and that the adjusting spring is disposed as the lowermost spring. Accordingly, the running-wheel braking part is indeed coupled to the actuating push rod in terms of movement, but it is not linked rigidly thereto. In particular in the case of the actuating push rod being displaced in the direction in which the spring is relieved of loading, the spring adjusts the running-wheel braking part in accordance with the path of the push-rod displacement. Any springs which may also be provided as constituent parts of the roller working parts are provided above the adjusting spring, and this makes it possible to achieve a reduction in the overall height of the roller, in particular of the carrying housing.

Also described are features which are important preferably in combination with the features of claim 27 but, in principle, may also be important with only some of the features of claim 27 or on their own.

It thus also proves to be advantageous if the adjusting spring is supported on a housing-mounted base, which, accordingly, cannot be repositioned axially. This base, further preferably, is formed beneath the running-wheel axis, while, in one configuration of the subject matter, the free end surface of the lower free end of the actuating push rod, in any operational axial position, runs above the running-wheel axis.

The invention also relates to a roller with a running wheel, a running-wheel-axle body and a running-wheel hub, an externally visible covering part being connected to the running-wheel-axle body.

Rollers of the type in question are known, the covering part connected to the running-wheel-axle body serving, for example, as a guard against fibers.

In order for a roller of the type in question to be improved further, it is proposed that the covering part is connected to the running-wheel-axle body at least by frictional fitting and, during use, the running-wheel hub rotates relative to the covering part. This configuration gives rise, during use of the roller, to a relatively high speed between the revolving covering-part peripheral edge and the directly associated portion of the running wheel, as a result of which, in addition, it is more difficult for fibers or the like to penetrate. The covering part, which is connected to the running-wheel-axle body, remains at a standstill relative to the rotating running wheel and the running-wheel hub, which, in addition, also makes it easier to see logos or information which are applied to the covering part from the outside.

Also described are features which are important preferably in combination with the features of claim 30 but, in principle, may also be important with only some of the features of claim 30 or on their own.

It is thus also provided that the covering part is covered over by a transparent protective part. This transparent protective part, in addition, allows the covering part to be seen. It is thus possible to see, for example, fibers or the like which have penetrated between the covering part and protective part. If a certain degree of contamination has been reached, the protective part can be removed in order for the fibers to be removed. It is also possible to see through the transparent protective part, for example, to a logo or the like on the covering part, which remains at a standstill relative to the running wheel.

The protective part is disposed such that it rotates along with the running-wheel hub, so that a relatively high circumferential speed is also achieved between the covering part and protective part.

The diameter of the covering part is selected such that, starting from the radially inward direction, this covering part engages partially over the running-wheel hub and thus provides at least protection for ball bearings or the like disposed between the-running-wheel axis and running-wheel hub. The protective part is latchingly held-on the running-wheel hub, thus, in particular, in the region of the circumference of the protective part, it being possible, in addition, for liquid-tight sealing of the running-wheel hub and running-wheel axis, for the protective part to interact circumferentially along the peripheral edge, for example, with a sealing element.

The solution envisaged for arranging a covering part can also be used for double rollers of the type mentioned in the introduction, in the same way as the features of the invention in respect of the double rollers may also apply to single rollers.

Combinations of the features of independent claims 1, 17, 27 and 30 and of the features of the respectively associated dependent claims are also possible and thus form subject matter of the invention.

The invention will be explained in more detail hereinbelow with reference to the accompanying drawing, which merely illustrates an exemplary embodiment and in which:

FIG. 7 shows a perspective illustration solely of the running-wheel braking part with the engagement parts;

FIG. 8 shows an exploded illustration of the running-wheel braking part with the engagement parts;

FIG. 9 shows an illustration in detail form relating to the interaction of the running-wheel braking part and engagement parts and a toothing formation of the associated running wheel, this illustration being depicted, in addition, with the omission of further housing and internal parts of the double roller;

FIG. 11 shows an enlarged illustration of the region XI in FIG. 10;

FIG. 12 shows an illustration corresponding to FIG. 9, but this time relating to the operating position according to FIG. 10;

FIG. 13 shows the section along line XIII-XIII in FIG. 2, relating to the full-locking position according to the illustration in FIG. 5; and FIG. 14 shows an exploded illustration, in perspective, of the double roller.

Figure 1:
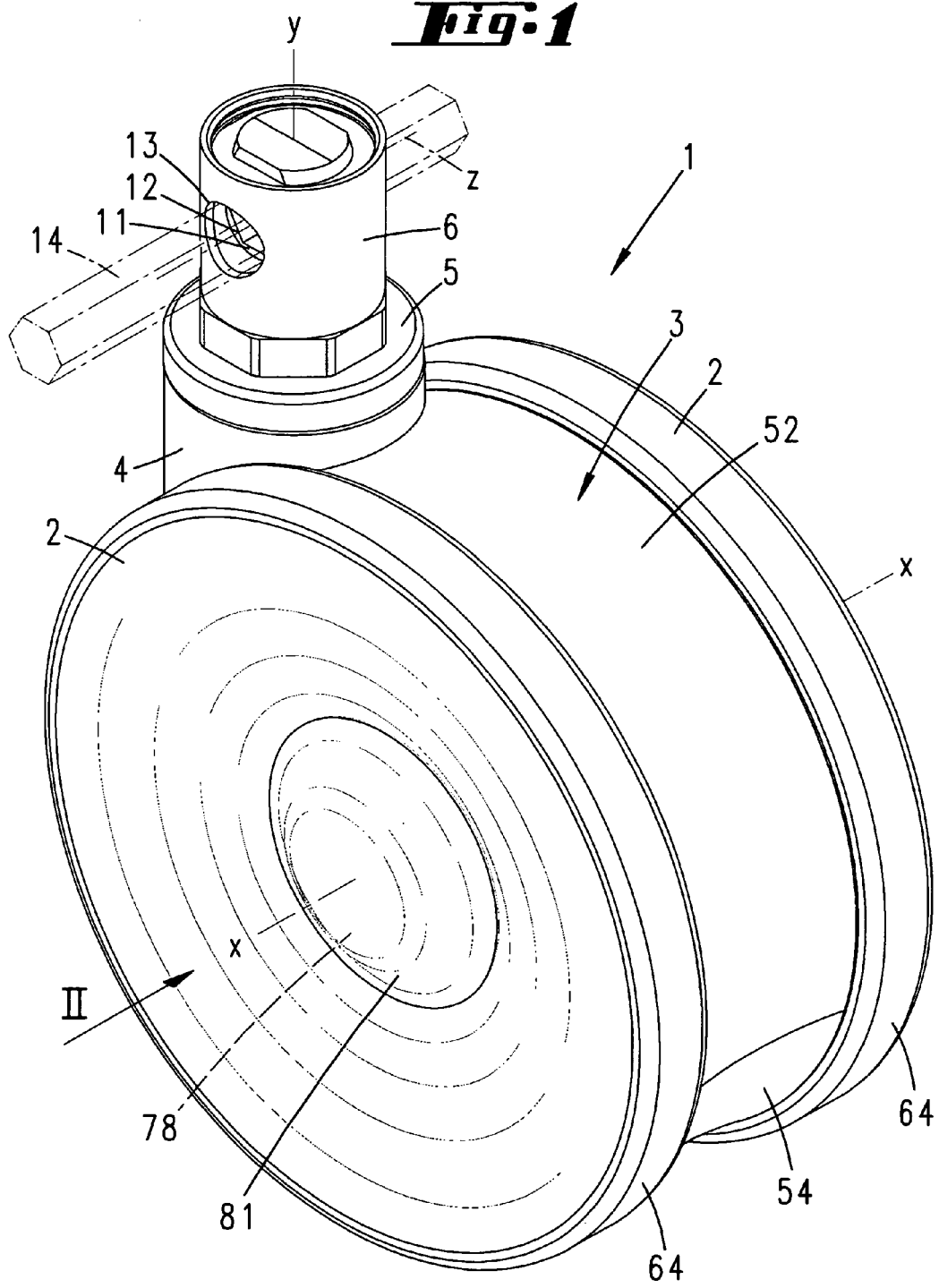
FIG. 1 shows a perspective illustration of a double roller.
Figure 2:
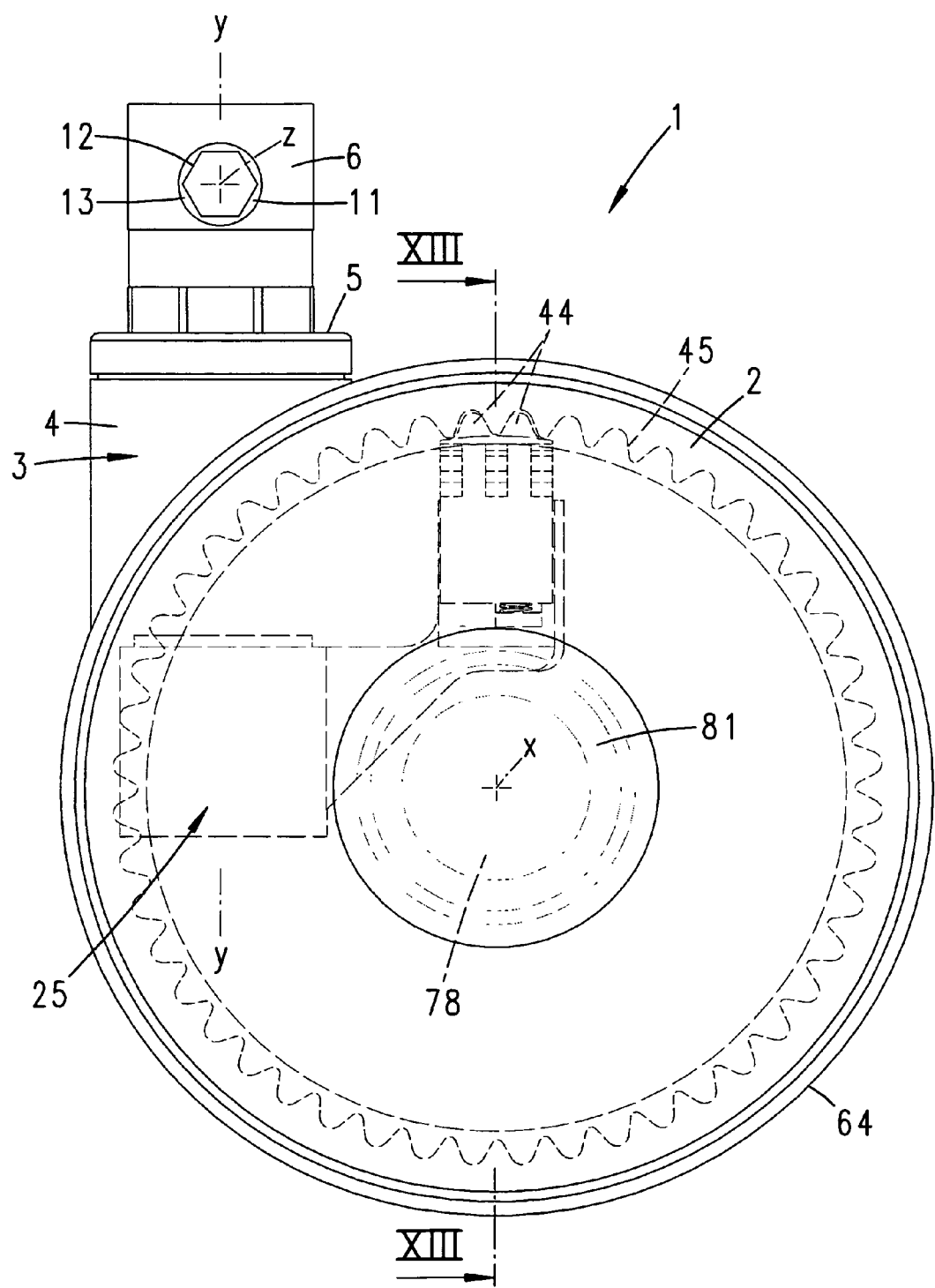
FIG. 2 shows the view as seen in the direction of the arrow II in FIG. 1.
Figure 3:
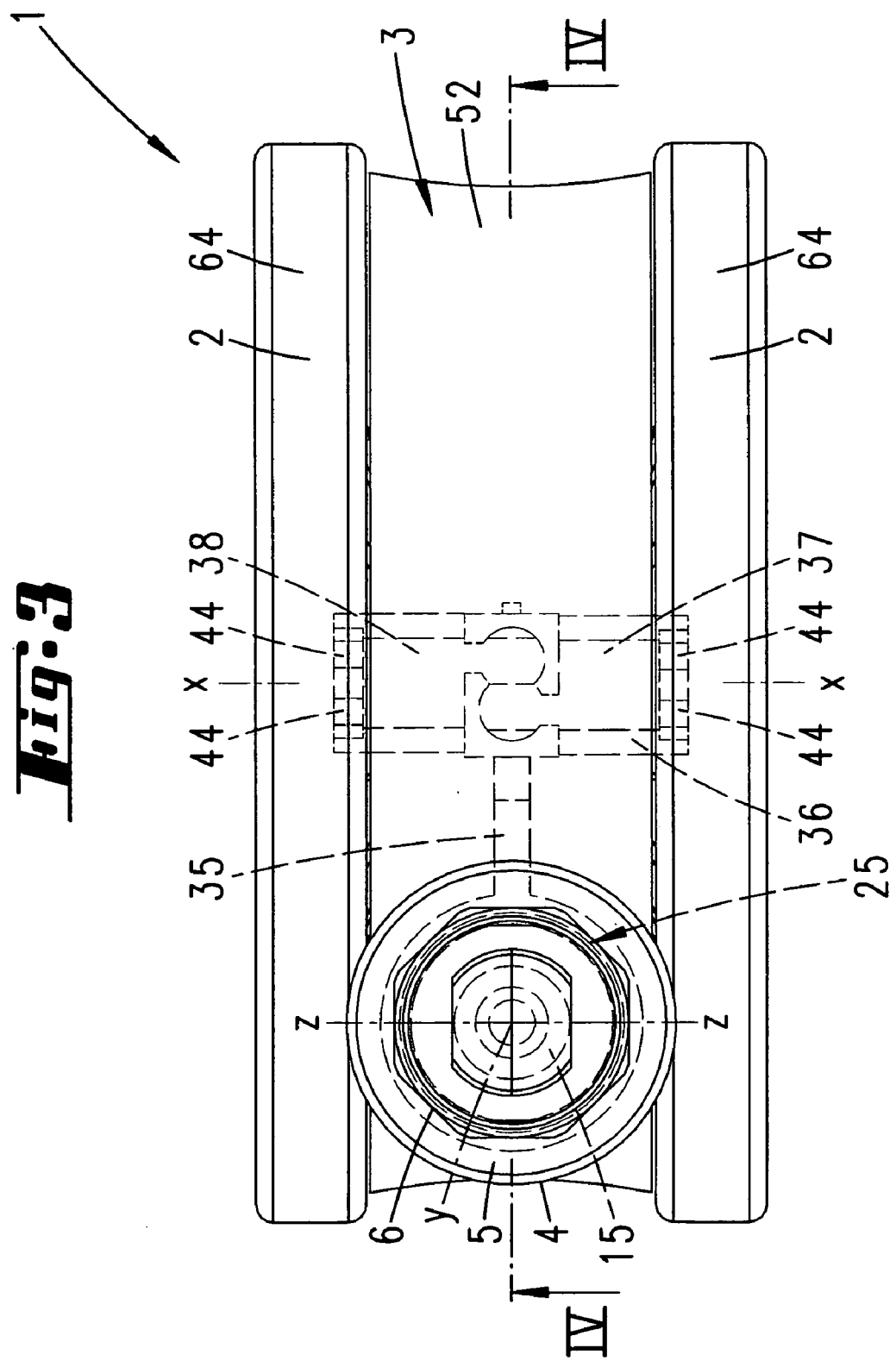
FIG. 3 shows the plan view of the double roller.

A double roller 1 with two running wheels 2 and a carrying housing 3 is illustrated and described, in first instance with reference to FIG. 1.

The carrying housing 3 has, in first instance, a region which is in the form of a circular-cylinder portion and on the two side surfaces of which, a respective running wheel 2 is disposed. Accordingly, the running-wheel axis x passes through the circular-cylinder portion of the carrying housing 3 centrally.

Starting from this circular-cylinder portion of the carrying housing 3, a carrying-housing portion 4 extends approximately tangentially. This is formed as a hollow circular cylinder, with a cylinder axis which is oriented perpendicularly to the running-wheel axis x. The external diameter of this carrying-housing portion 4 corresponds substantially to the width of the circular-cylinder portion of the carrying housing 3 as measured in the direction of the running-wheel axis.

The free end plane of the hollow-cylindrical carrying-housing portion 4 extends at a small distance from an imaginary parallel plane which is tangent to the running-wheel surfaces at the vertex, that is to say, in the exemplary embodiment illustrated, it projects beyond this plane by a distance a of 1-4 mm.

A mounting pin 6, likewise substantially in the form of a hollow cylinder, is formed beyond this free end surface 5 of the carrying-housing portion 4. This mounting pin is oriented coaxially in relation to the carrying-housing portion 4 and penetrates into the carrying-housing portion 4 by way of a portion 7 which has a smaller diameter than the visible region. The mounting pin 6 is supported radially against the inner wall of the carrying-housing portion 4 by two ball bearings 8 and 9. As seen in the axial direction of the carrying-housing portion 4, these ball bearings are disposed more or less directly one beneath the other, only being spaced apart by means of an intermediate ring 10.

This intermediate ring 10 has an axial height which corresponds approximately to that of one of the ball bearings 8 and 9.

The axially outer ball bearing 8, i.e. the upper ball bearing directed immediately toward the free end surface 5, has a larger diameter than the ball bearing and, accordingly, also has larger-diameter bearing balls. The lower ball bearing 9 is associated with the free end region of the portion 7 of the mounting pin 6.

As a result of this arrangement, the mounting pin 6 can be pivoted freely in relation to the carrying housing 3 about an axis y which passes centrally through the carrying-housing portion 4.

A control cam 11 is held in the mounting pin 6. This control cam can be pivoted about an axis z which is oriented transversely to the pivot axis y of the roller, the axis z passing centrally through a hexagonal holder 12 of the control cam 11. In extension of this hexagonal holder 12 on both sides, the mounting pin 6, which encloses the control cam 11, has through-openings 13 for engagement of a tool 14 or the like acting on the control cam 11.

The control cam 11 acts on an actuating push rod 15, which has the pivot axis y in, the center. This actuating push rod is elongate with a quadrilateral cross-section formed in the region of interaction with the neck-like portion 7 of the mounting pin 6. The actuating push rod 15 is thereby connected to the mounting pin 6 in a positively locking manner, such that it is rotationally fixed but can be displaced axially in relative terms.

The control cam 11 acts on the upper free end surface 16 of the actuating push rod 15 by way of control surfaces 17, 17' and 17", which are disposed on different diameter lines in relation to the axis of rotation z, in order to place the actuating push rod 15 in different axial positions.

In dependence on the circumferential distances between the control surfaces 17, 17' and 17", radially projecting latching protrusions 18, 18', 18" are formed on a common radius line on the control cam 11, substantially opposite the control surfaces. These latching protrusions interact with a leaf spring 19 which, when the actuating push rod 15 rotates, engages into the movement path of the latching protrusions above the control cam 11 and is retained on the head of the mounting pin 6. The leaf spring 19 has a central hollow 20 adapted to the shaping of the latching protuberances 18, 18' and 18".

Beneath tilting-prevent means, formed by the mounting-pin portion 7 and the ball bearings 8 and 9, the actuating push rod 15 forms a directional-locking part 21. In the exemplary embodiment illustrated, this is formed by two wing portions 22 which are arranged diametrically opposite one another in relation to the pivot axis y, extend radially outward from the push-rod body and have their radial extent adapted to the internal dimensioning of the opening of the hollow-cylindrical carrying-housing portion 4 in the upper region, region, i.e. the region associated in particular with the ball bearing 9.

The actuating push rod 15 extends downward beyond the directional-locking part 21, it being the case that the relevant end of the actuating push rod 15, this end being oriented downward and thus being directed away from the control cam 11, is disposed, irrespective of the-axial position selected via the control cam 11, in a plane above the running-wheel axis x.

This free end 23 of the actuating push rod 15, which additionally, beneath the directional-locking part 21, is in the cross-sectional form of a circular disk with a diameter which corresponds approximately to half the diameter of the opening of the carrying-housing portion 4, is supported radially by being mounted in a central hollow-cylinder portion 24 of a running-wheel braking part 25. This hollow-cylinder portion 24 is connected to a radially outer cylinder ring 27 via a radial collar 26, which is disposed approximately centrally along the axial extent of the hollow-cylinder portion 24. This cylinder ring 27 has an external diameter which is adapted to the diameter of the opening of the carrying-housing portion 4 and, accordingly, is guided in the carrying-housing portion 4.

The central hollow-cylinder portion 24 of the running-wheel braking part 25, in addition, accommodates, in an adjustable manner, an adjusting screw 28 which has the pivot axis y centrally and the upwardly oriented free end of which acts on the end surface of the free end 23 of the actuating push rod 15. The screwing-tool opening 29 is oriented downward.

The relative axial distance between the running-wheel braking part 25 and the actuating push rod 15 can be changed via the adjusting screw 28.

Annular spaces 30, 31, separated axially by the radial collar 26, are established between the central hollow-cylinder portion 24 and the radially outer cylinder ring 27, the annular space 30 being open in the downward direction and the annular space 31 being open in the upward direction.

A cylinder-like push-rod spring 32 engages in the lower annular space 30. This spring is supported, at one end, on the underside of the radial collar 26 of the running-wheel braking part 25 and, at the other end, on a base 33 of the carrying housing 3, this base extending in a plane parallel to the radial collar 26 and thus perpendicularly to the pivot axis y.

The base 33 is provided, in extension of the axis of rotation y, with a through-hole 34. The latter, accordingly, is aligned with the adjusting screw 28, as a result of which this screw is accessible from the outside via a tool.

Via the push-rod spring 32, the actuating push rod 15 is biased upward in the direction of the control cam 11 indirectly via the running-wheel braking part 25 and the adjusting screw 28.

An extension arm 35 is formed integrally on the outside of the running-wheel braking part 25, in particular on the outside of the cylinder ring 27, in the direction toward the roller interior. This extension arm carries at its end, above the running-wheel axis x with the roller oriented for conventional operation, a holder 36 which opens upward in a U-shaped manner in cross-section and is intended for accommodating two engagement parts 37, 38 which are suitable for acting on the running wheels 2. These engagement parts 37, 38 can be displaced radially in the holder 36 in relation to the running-wheel axis x, the displacement path being stop-limited in the radially outward direction, i.e. in the direction away from the retaining base 39. The engagement parts 37, 38 are subjected to loading in this radially outward direction by a respective compression spring 40, 41, which is supported on the retaining base 39. The radial orientation is selected to be parallel to the orientation of the pivot axis y.

In addition, in the upper-region projecting beyond the holder 36, each engagement part 31, 38 has a leg 42, 43 oriented parallel to the running-wheel axis x. Starting from a center plane of the double roller 1, this plane being oriented perpendicularly to the running-wheel axis x, these two legs 42, 43 extend in opposite directions on both sides of the holder 36, in addition upwardly projecting engagement teeth 44 being integrally formed on the free end peripheral edges. In the exemplary embodiment illustrated, each engagement part 37 and 38 carries two such engagement teeth 44. These are formed for interacting with a respective toothing formation 45 provided all the way round the inside of the running wheel. The arrangement, furthermore, is selected such that the engagement teeth 44 and running-wheel toothing formation 45 interact at the vertex of the respective running wheel 2, as seen in relation to the running-wheel axis x with the roller oriented for conventional use. The toothing formation 45 on the running wheel is provided in the vicinity of the periphery; accordingly, its annular diameter is adapted to the diameter of the running wheel.

The extension arm 35 passes through the hollow-cylindrical carrying-housing portion 4 in the region of a correspondingly provided slot 46 which allows axial displacement of the running-wheel braking part 25. In addition, once through the slot 46, the extension arm 35 is located in a central chamber 47 of the carrying housing 3, which chamber 47, as seen in the direction in which the running-wheel axis x extends, and being aligned centrally as a whole, is narrower than the carrying-housing portion 4 and also than the further chamber 48, which is located opposite this carrying-housing portion 4.

For the through-passage in particular of the legs 42, 43 of the engagement parts 37, 38, the central chamber 47 has correspondingly formed and oriented lateral window openings 49.

The carrying housing 3, in addition, is formed substantially in two parts, that is to say it has an upper housing part 50 and a lower housing part 51, the upper housing part 50 forming the carrying-housing portion 4, the central chamber 47 and the further chamber 48. For separation of the upper housing part 50 and the lower housing part 51, the carrying housing 3 is split horizontally, the separating plane T being selected to be beneath the running-wheel axis x.

The carrying-housing portion 4 and the chambers 47 and of the upper housing part 50 are open in the downward direction, i.e. in the direction of the separating plane T. The chambers are covered over in the radially outward direction by a circumferential wall 52 which is produced integrally with the carrying-housing portion 4 and the crosspieces which subdivide the chambers.

The lower housing part 51 has a centrally arranged wall crosspiece 53, as seen in the direction of orientation. of the running-wheel axis x. In a cross-section according to the illustration in FIG. 4, this wall crosspiece fills the entire lower part of the housing 4 and carries, in the radially outward direction, a circumferential wall portion 54 which, when the housing 3 is in the assembled state, runs in extension of the circumferential wall 52 of the upper housing part 50.

The base 33 is formed on the lower housing part 51; accordingly, it is fitted on the wall crosspiece 53, oriented transversely to the running-wheel axis, such that the entire lower housing part 51 is formed in one piece. The through-hole 34 through the base 33 is guided rectilinearly outward through the wall portion 54. A further through-hole 55 connects the further chamber 48 to the surroundings in a likewise rectilinear manner.

The lower housing part 51 is secured to the upper housing part 50 via latching means 56 (not illustrated specifically).

Furthermore, a plug-in positively locking connection is provided. between the upper housing part 50 and lower housing part 51, for which purpose the lower housing part 51 has a hub portion 57 which projects into the central chamber 47 and projects, vertically from the base 33. This hub portion 57 has an axle-passage opening 58. With the housing 3 in the assembled position, this opening accommodates the running-wheel axis x centrally. Coaxially in relation to this axle-passage opening 58, the housing walls which bound the chamber 47 also have through-openings 59 of matching diameter. The housing portions which enclose the axle-passage openings 58 and the through-openings 59 of the upper housing part 50 and lower housing part 51 each form part of the axle-body mount 60.

The axle body 61 is in the form of a hollow axle. The latter is retained in a frictionally fitting manner in the axle-body mount 60 of the housing 3. Positive locking is also possible. As seen along the extent of the running-wheel axis, the axle body 61 projects beyond both sides of the axle-body mount 60 of the housing 3 and carries at each end a ball bearing 62, onto which the hub 63 of a running wheel 2 is snap-fitted in each case. The running surface 64 of each running wheel 2 projects radially beyond the circumferential wall 52 of the housing 3.

As a result of the arrangement described above, the running wheels 2 are mounted on the axle body 61 such that they can be rotated independently of one another.

The axle body 61 is provided axially on the outside in each case with a covering part 78. This is, in first instance, in disk form and has a central pin 79 oriented inward, for frictionally fitting engagement in the axle-body cavity.

The diameter of the covering part 78 is selected such that this covering part engages over the hub region of the respective running wheel 2, that is to say, in addition, in particular also the ball-bearing region. The covering-part peripheral edge penetrates into an annular depression region 80 provided in the running-wheel hub.

As a result of the axle body 61 being retained in a frictionally fitting manner in the region of the carrying-housing hub, and of the covering part 78 also being retained in a frictionally fitting manner on the axle body 61, the covering part 78, while the running wheels 2 can rotate freely via the ball bearing 62, preferably remains at a standstill, and accordingly does not rotate.

The covering part 78 is covered over by a transparent protective part 81. The latter is curved convexly in a plate-like manner and is latchingly held in the region of the radially outer encircling periphery of the depression region 80, in which latching region a seal 82 is provided to give a liquid-tight arrangement. Accordingly, it is not possible for any liquid to pass into the hub region and therefore into the region of the ball bearings 62. This arrangement means that the double roller 1 illustrated can be washed without any adverse effects.

In one position of the control cam 11, the actuating push rod 15, which can be displaced axially downward counter to the push-rod spring 32, interacts, by way of its directional-locking part 21, with a locking counter-part 65 accommodated in the carrying-housing portion 4. This locking counter-part is retained in the housing opening, through which the actuating push rod 15 also passes, in a rotationally fixed, but axially moveable, manner, and, in addition, it is retained in a region of the opening of the carrying-housing portion 4 which is larger in diameter than the external diameter of the directional-locking part 21. The locking counter-part 65 has a lateral wall which is adapted to the difference in diameter described above and from which a locking base 66, through which the push-rod body passes, extends radially inward in the center, as seen in the axial direction. In the direction toward the directional-locking part 21, this locking base 66 has two depressions 67 which are adapted in outline to the wing portions 22.

The locking base 66 is provided on the underside with an encircling toothing formation 68 for interacting with a pivoting-blocking part 69 which is disposed substantially beneath the locking counter-part 65, coaxially in relation to the same. This pivoting-blocking part has, in the direction of the locking counter-part 65, a surface with a mating toothing formation 70.

The pivoting-blocking part 69 has a collar 71 which encloses the central opening accommodating the actuating push rod 15. Starting from the pivoting-blocking-part 69, this collar extends upward to be supported on the underside of the wing portions of the directional-locking part 21, the collar additionally passing through the locking base of the locking counter-part 65.

The locking counter-part 65 and pivoting-blocking part are biased in the direction of the directional-locking part 21, for which purpose each part has a cylinder spring. The pivoting-blocking part 69 is therefore subjected to loading against the directional-locking part 21 by means of a second biasing spring 72. This second biasing spring 72 is supported on the pivoting-blocking part 69 on the underside, which is directed away from the mating toothing formation 70. At the other end, the second biasing spring 72 enters into the annular space 31 of the running-wheel braking part 25, for support on the radial collar 26. The second biasing spring 72 acts in the same direction as the push-rod spring 32.

A first biasing spring 73 is provided concentrically in relation to the second biasing spring 72. This first biasing spring is supported on the facing, upper end surface of the cylinder ring 27 of the running-wheel braking part 25 and subjects the underside of the wall of the locking counter-part 65 to loading in order to bias the locking counter-part 65 in the direction of the control cam 11, the locking counter-part 65 being supported in the housing 3, or the housing portion 4, in the region of a housing shoulder 74.

Figure 4:
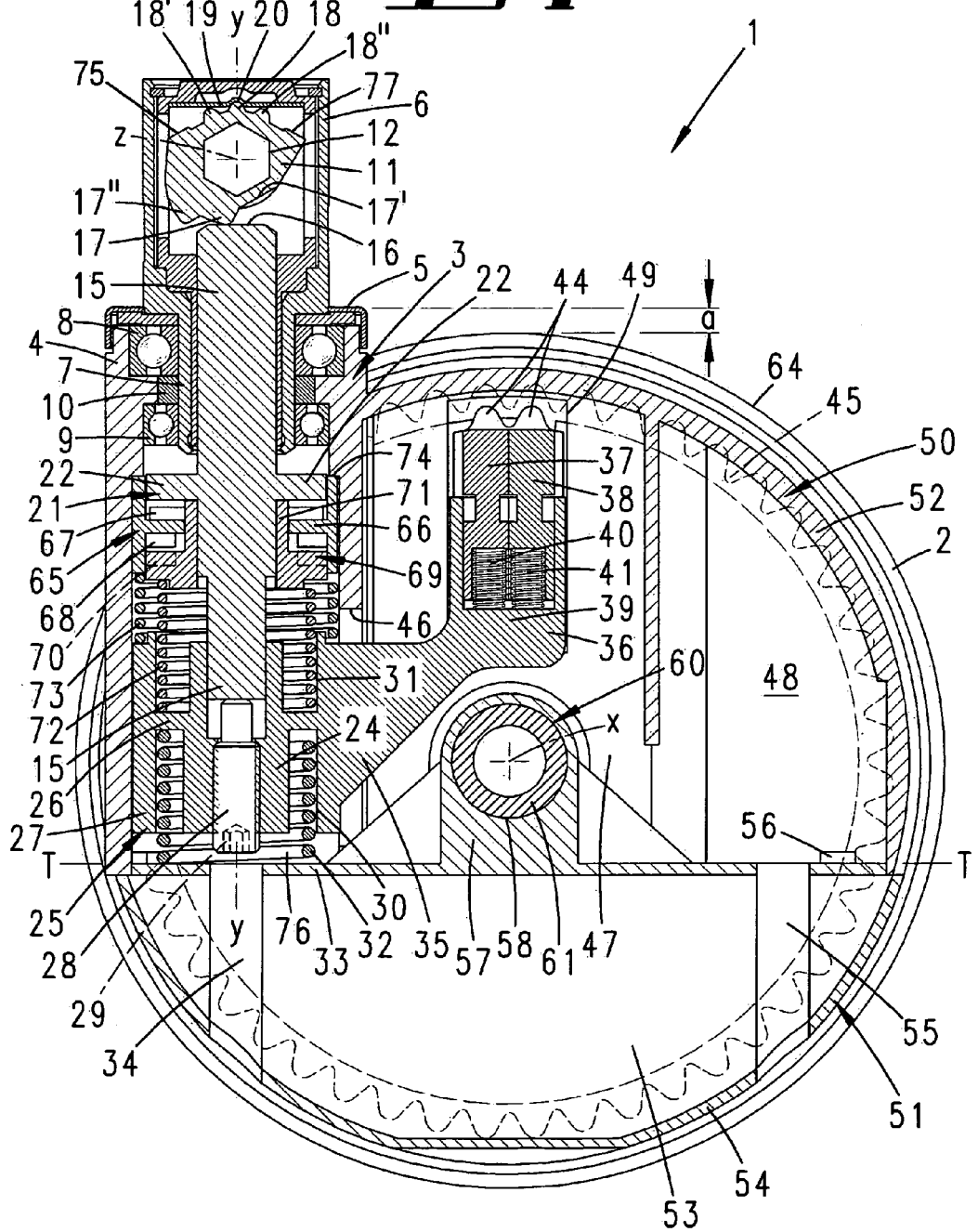
FIG. 4 shows the section along line IV-IV in FIG. 3, relating to the basic position, i.e. the fully released position of the double roller.
Figure 5:
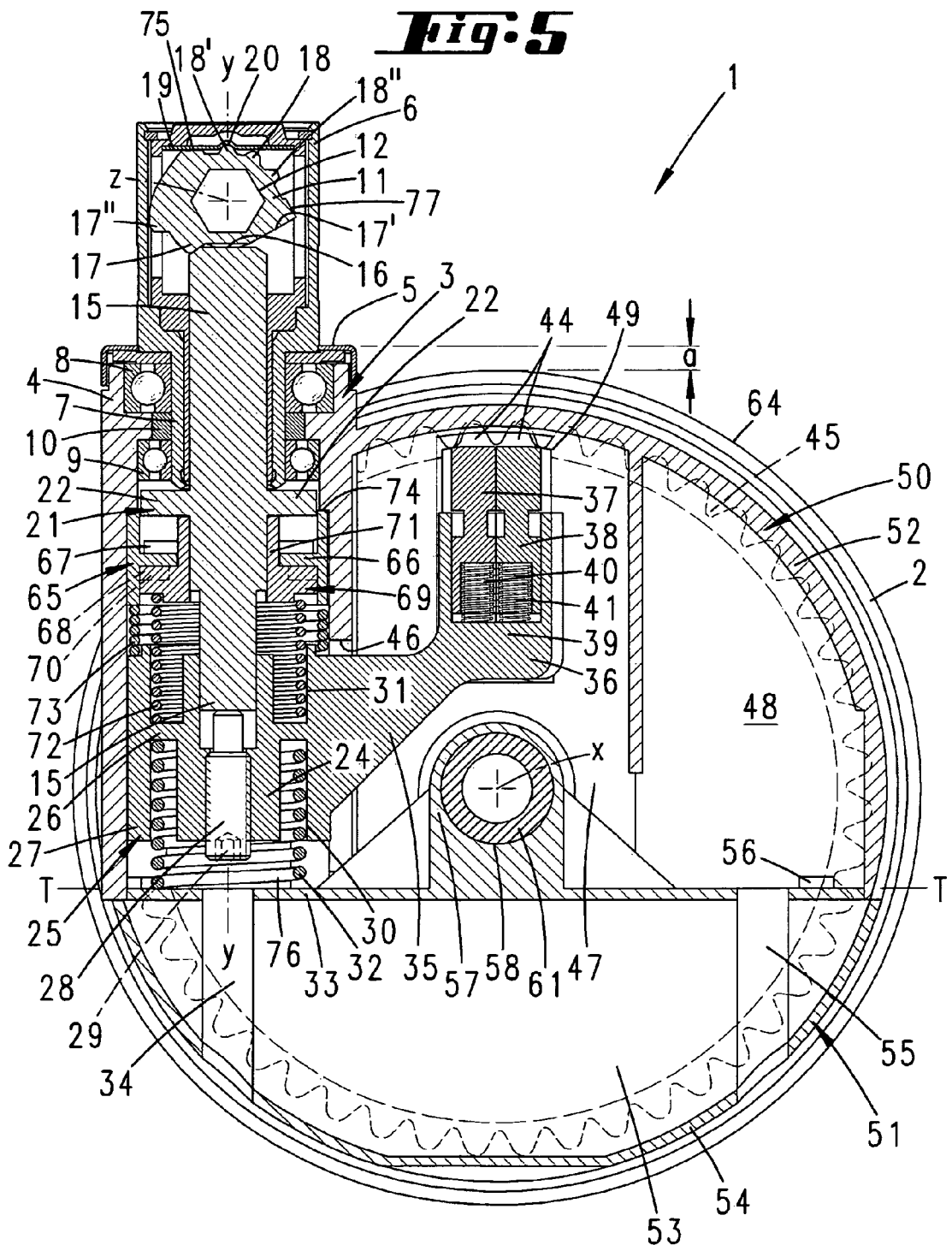
FIG. 5 shows a sectional illustration corresponding to FIG. 4, but this time relating to full locking.
Figure 6:
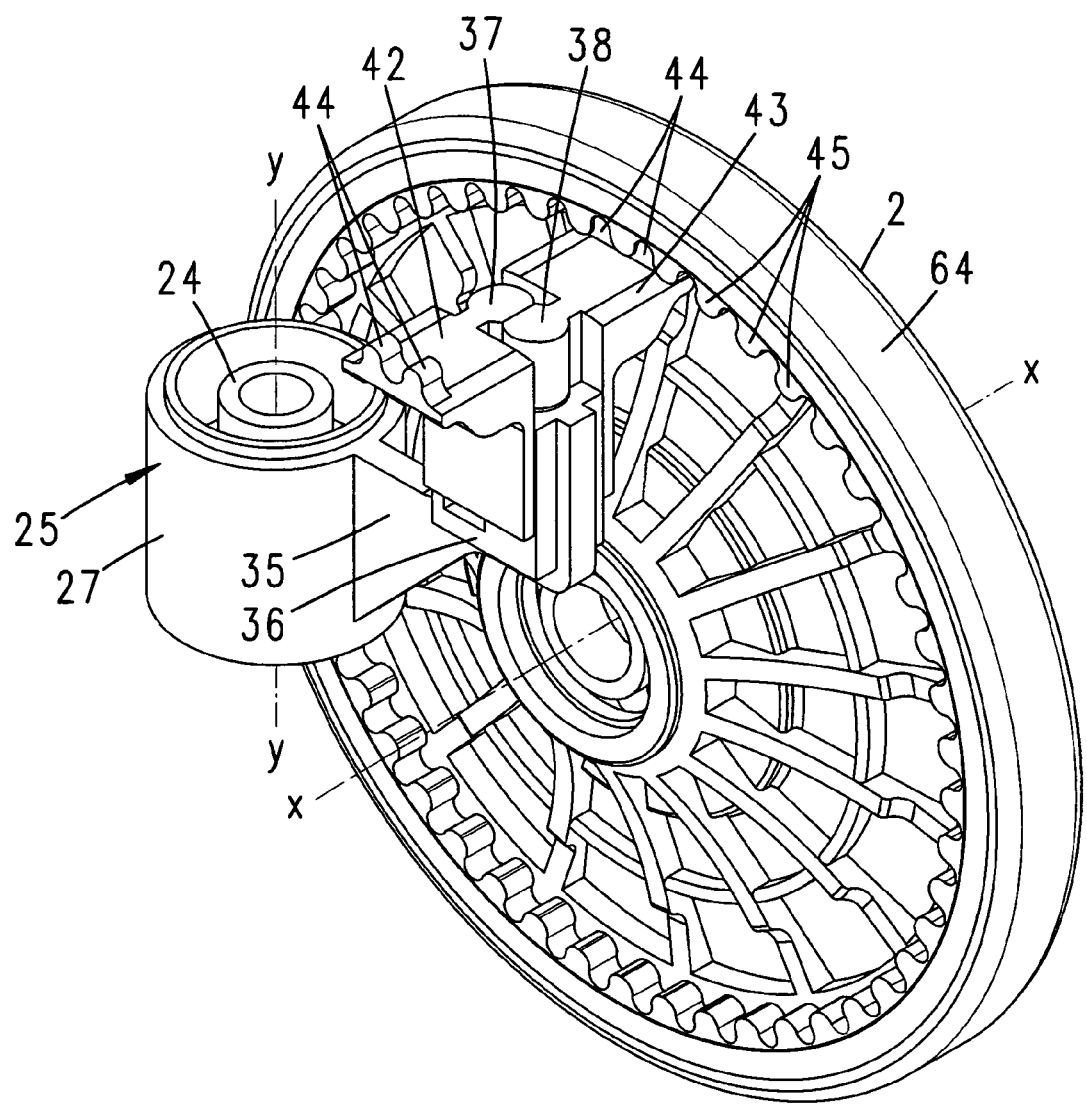
FIG. 6 shows a perspective illustration solely of running wheel of the double roller, with a view of the inside and with a running-wheel braking part which is provided with engagement parts and intended for interacting with the running wheel.
Figure 10:
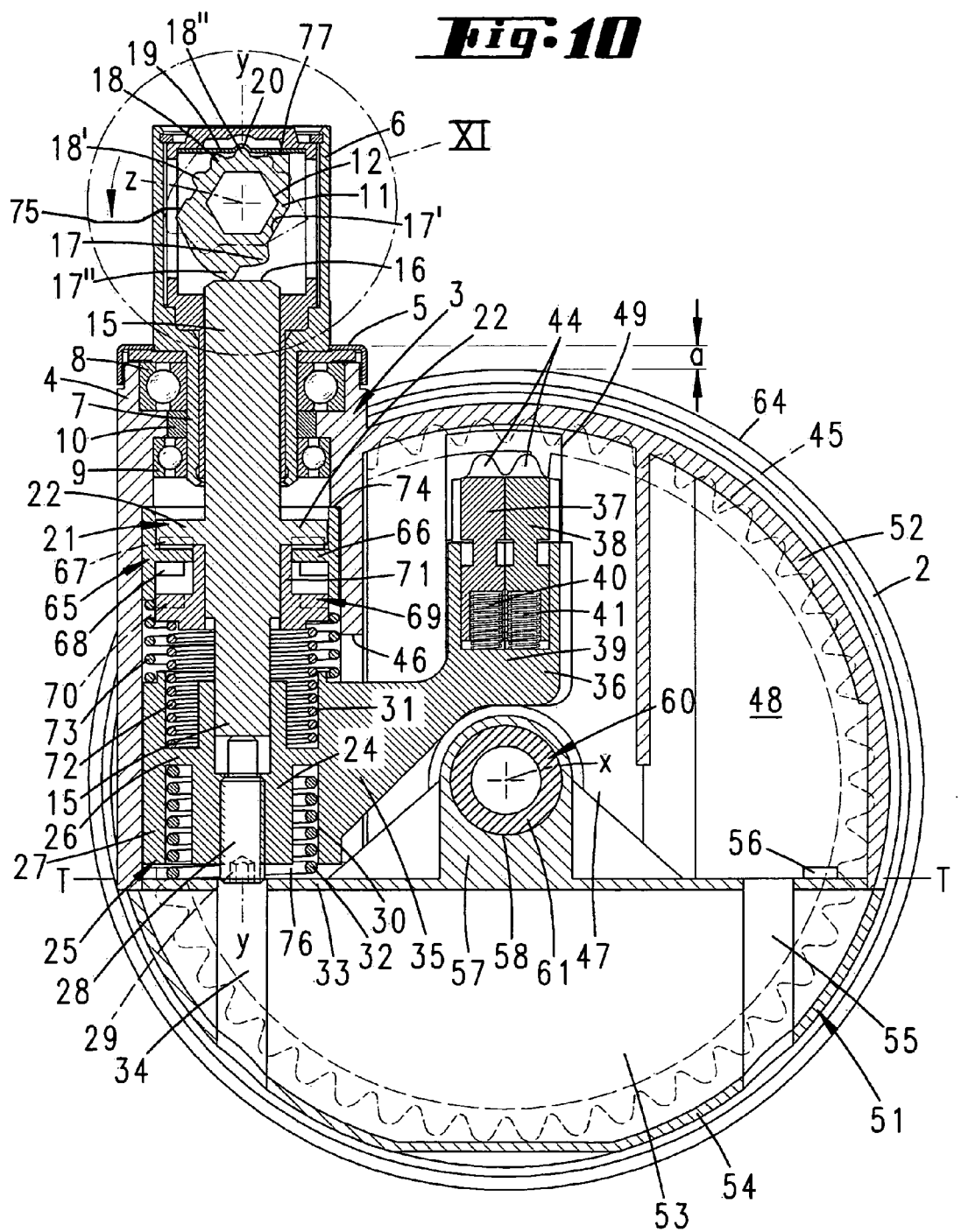
FIG. 10 shows a further sectional illustration corresponding to FIG. 4, but this time relating to directional locking.

The control cam 11, which can be rotated about the axis z, can move the double roller 1 into different functional positions, that is to say into a neutral position (swiveling-caster position) as illustrated in FIG. 4, a full-locking position illustrated in FIG. 5 and a fixed-caster position illustrated in FIG. 10.

In the neutral position or swiveling-caster position according to FIG. 4, the running wheels 2 are freely rotatable about their running-wheel axis x and, at the same time, the entire roller can be pivoted freely about the pivot axis y. This is achieved by moving the control cam 11 into a central position, as seen in relation to the pivotability of the same and in which the central latching protuberance 18 engages in the associated hollow 20 of the leaf spring 19. The associated control surface 17 located opposite acts on the end surface 16 of the actuating push rod 15, the directional-locking part 21 of which, in this neutral position of the double roller 1, remains at an axial distance above the depressions 67 of the locking counter-part 65. Accordingly, the locking counter-part 65 and directional-locking part 21 do not engage.

Via the directional-locking part 21 of the actuating push rod 15, the pivoting-blocking part 69 is carried along into a position in which it is spaced apart axially from the locking counter-part 65, so that also positive locking is not established between these parts. This results in the free pivotability of the roller about the axis y.

Via the actuating push rod 15, in addition, counter to the force of the push-rod spring 32, via the adjusting screw 28, the running-wheel braking part 25 is also moved into an axial position in which the engagement teeth 44 of the engagement parts 37, 38 are spaced apart from the toothing formations 45 on the running wheel, as a result of which the running wheels 2 can rotate freely.

From the neutral position, the control cam 11 can be rotated in one direction or the other, i.e. looking at the illustrations in FIGS. 4, 5 and 10 in the clockwise or counterclockwise direction, into either the full-locking position or the fixed-caster position.

FIG. 5 illustrates the full-locking position of the double roller 1. The control cam 11 has been rotated in the clockwise direction about the axis z, as seen in relation to the illustration, from the neutral position according to FIG. 4. The associated latching protuberance 18', with the leaf spring 19 yielding resiliently in the meantime according to the illustration in FIG. 11, has moved into the associated hollow 20. This control-cam rotary end position is stop-limited. A correspondingly formed stop surface 75 here engages on the underside against an end portion of the leaf spring 19 which is supported in the mounting pin 6.

By virtue of the control cam 11 being pivoted, the control surface 17' of the control cam 11 is moved into the active position, which allows the actuating push rod 15 to be displaced axially upward, i.e. in the direction of the control cam 11. Accordingly, with the assistance of the push-rod spring 32, which forms an adjusting spring 76, the actuating push rod 15 moves axially upward in a stop-limited manner, the stop-limiting means being formed in that the integrally formed directional-locking part 21 engages against the free neck portion 7 of the mounting pin 6 beneath the ball-bearing arrangement, this free neck portion projecting into the carrying-housing portion 4. In the exemplary embodiment illustrated, the axial displacement path of the actuating push rod out of the neutral position according to FIG. 4 into the full-locking position according to FIG. 5 is approximately 4 mm.

As a result of the axially upward displacement of the actuating push rod 15, the pivoting-blocking part 69, which in turn is forced in the direction of the control cam 11 via the second biasing spring 72, enters into the toothing formation 68 of the locking counter-part 65 by way of its mating toothing formation 70. The plurality of individual teeth provided in respect of the toothing formation 68 and of the mating toothing formation 70 make it possible for pivoting of the double roller 1 to be blocked in virtually any pivoting position of the roller. For this purpose, in the exemplary embodiment illustrated, the pivoting-blocking part 69 has thirty-two teeth distributed uniformly over the circumference, for interacting with a corresponding number of tooth gaps in the locking counter-part 65, and it is thus possible for pivoting of the roller 1 to be locked in thirty-two pivoting positions.

If such blocking is to take place from a pivoting position of the double roller 1 in which the mating toothing formation 70 of the pivoting-blocking part 69 engages against the toothing formation 68 of the locking counter-part 65, the arrangement of the second biasing spring 72 means that the actuating push rod 15 can nevertheless be displaced axially upward into its stop-limited position. The second biasing spring 72 here serves as a compensating spring for subsequent axial displacement of the pivoting-blocking part 69 into the positively locking position in relation to the locking counter-part 65 following slight pivoting of the double roller 1, whereupon the toothing formation engage automatically via the second biasing spring The displacement of the control cam 11 into the position which is illustrated in FIG. 5 causes the push-rod spring 32, which forms an adjusting spring 76, to be relieved of loading, which gives rise to the axially upward displacement of the running-wheel braking part 25 and, via the adjusting screw 28 retained by screwing action in the braking part, to the axially upward displacement of the actuating push rod 15. In addition, the two biasing springs 72 and 73 are also displaced via the running-wheel braking part 25. While the first biasing spring, which interacts with the locking counter-part 65, is compressed as a result of the upward displacement of the running-wheel braking part 25, the second biasing spring 72, with the proviso that the mating toothing formation 70 of the pivoting-blocking part 69 is staggered in relation to the toothing formation 68 of the locking counter-part 65, is merely moved in the axial direction without being subjected to any further compressive loading.

In addition, via the running-wheel braking part 25, it is also the case that the engagement parts 37, 38 are displaced parallel to the alignment of the actuating push rod 15 such that the engagement teeth 44 are moved radially outwards in relation to the running-wheel axis of rotation x, in order to engage in the toothing formations 45, which face inwardly on the inside of the running wheels 2 at a small radial distance from the running surface thereof. Accordingly, the running wheels 2 are secured against rotation about the running-wheel axis x. The compression springs 40 and 41 retain the engagement parts 37 and 38 such that they can yield radially inward independently of one another. It is therefore possible for one engagement tooth 44 of one engagement part 37 or 38, as is illustrated in FIG. 13, to engage in the associated toothing formation 45 of a running wheel 2, while the engagement teeth 44 of the other engagement part butt flush against the toothing formation 45 of the associated running wheel 2 and thus do not pass into the engagement position. This is achieved automatically once the double roller 1 has been shifted slightly, by the still free running wheel 2 being rotated to slight extent, whereupon the engagement teeth 44 drop, with spring assistance, into the next tooth gaps.

By virtue of the control cam 11 being rotated back, the engagement of the pivoting-blocking part 69 and locking counter-part 65 is released via the actuating push rod 15, and the positively locking engagement between the engagement teeth 44 and the toothing formations 45 of the running wheels 2 is released indirectly via the adjusting screw 28 and the running-wheel braking part 25.

Also starting from the neutral position in FIG. 4, the fixed-caster position is reached by virtue of the control cam 11 being rotated in the counterclockwise direction. In this position, the latching protuberance 18" engages in the associated hollow 20 of the leaf spring 19. This control-cam position is also stop-limited, for which purpose the control cam has formed on it, adjacent to the latching protuberance 18", a stop surface 77 which, in this position, engages against a supported peripheral portion of the leaf spring 19.

The latching protuberance 18" is associated with the oppositely located end surface 17", which is spaced apart from the axis of rotation z by the radially largest distance. Via this control surface 17", the actuating push rod 15 is displaced into the axially lowermost position counter to the spring force of the push-rod or adjusting spring 32, 76, with the running-wheel braking part 25 being carried along in the process. Accordingly, the engagement parts 37, 38 are spaced apart from the running-wheel toothing formations 45 by a larger radial distance than is the case in the neutral position.

The pivoting-blocking part 69 is also carried along via the vertically downward displacement of the actuating push rod 15. The second biasing spring 72, which acts on the underside of this pivoting-blocking part, does not undergo any compression as a result of this displacement.

The directional-locking part 21, which is formed on the actuating push rod 15, is moved, by way of its wing portions 22, into engagement with the depressions 67 of the locking counter-part 65, in order to achieve rotational blocking of the double roller 1. Corresponding to the formation of just two wing portions 22 provided opposite one another, and corresponding to just two depressions 67 formed opposite one another in the locking counter-part 65, this rotational blocking is achieved only in two pivoting positions of the roller 1, that is to say in the two 180°-positions. If such a position has not yet been assumed, the wing portions 22 butt flush against the surface of the locking counter-part 65 circumferentially outside the depressions 67, which, as a result of the downward forced displacement of the actuating push rod 15, causes the locking counter-part to be displaced axially downward, against the restoring force of the first biasing spring 73, by the depth of the depressions 67. Subsequent pivoting of the roller 1 into the next 180°-position brings about automatic latching in as a result of the locking counter-part 65 being displaced upward, whereupon the wing portions 22 of the directional-locking part 21 are located in a positively locking manner in the depressions 67.

In this position, pivoting of the double roller 1 is blocked, although the running wheels 2 can rotate freely.

The teeth 44 of the engagement parts 37, 38 and the teeth of the running-wheel toothing formation 45 preferably have different tooth-flank angles, so that tooth engagement results not in full-surface tooth-flank abutment, but rather in linear to curved abutment. Thus, for example, the opening angle of a running-wheel toothing-formation gap is greater than the angle enclosed between two flanks which bound a tooth 44.

In the exemplary embodiment illustrated, from the neutral position according to the illustration in FIG. 4, the actuating push rod 15 is displaced axially downward into the fixed-caster position over a distance of approximately 2.5 mm.

All features disclosed are (in themselves) pertinent to the invention. The disclosure content of the associated/attached priority documents (copy of the prior application) is hereby also included in full in the disclosure of the application, also for the purpose of incorporating features of these documents in claims of the present application.

The invention claimed is:

1. A double roller with first and second running wheels and a carrying housing comprising a hollow housing portion, wherein a mounting pin is formed on the carrying housing and an actuating push rod accommodated in the housing portion is displaceable in the mounting pin counter to spring force and interacts with a locking counter-part for locking the running wheels in at least one direction, and wherein, in addition, a running-wheel braking part with engagement parts is provided, for rotational blocking of the running wheels in an engagement position of the engagement parts when the actuating push rod is in an uppermost position of the actuating push rod, and wherein, furthermore, the housing portion accommodating the actuating push rod has a first ball bearing on an upper side of the housing portion and encloses at least a lower portion of the actuating push rod, wherein the locking counter-part is located beneath a second ball bearing, in the housing portion.

2. The double roller according to claim 1, wherein an upper portion of the locking counter-part is supported by a housing shoulder.

3. The double roller according to claim 1, wherein the actuating push rod is supported radially in the housing beneath the locking counter-part only via the running-wheel braking part.

4. The double roller according to claim 1, wherein the actuating push rod is biased into the uppermost position via a push-rod spring.

5. The double roller according to claim 4, wherein the push-rod spring is supported on the housing and on the running-wheel braking part.

6. The double roller according to claim 1, wherein the second ball bearing is disposed beneath the first ball bearing and the first and second ball bearings are disposed above the locking counter-part.

7. The double roller according to claim 1, wherein for full locking of the running wheels in all directions, the locking counter-part interacts with a pivoting-blocking part, and wherein the locking counter-part and the pivoting-blocking part are movable axially independently of one another.

8. The double roller according to claim 7, wherein the locking counter-part and the pivoting-blocking part are subjected to loading in each case by a dedicated spring, a first biasing spring and a second biasing spring.

9. The double roller according to claim 8, wherein the first biasing spring and the second biasing spring are disposed concentrically in relation to one another.

10. The double roller according to claim 8, wherein the first biasing spring and the second biasing spring are both supported on the running-wheel braking part.

11. The double roller according to claim 7, wherein for directional locking of the running wheels, the locking counter-part interacts with a directional-locking part, and wherein the locking counter-part and the directional-locking part are movable axially independently of one another.

12. The double roller according to claim 11, wherein the directional-locking part is formed on the actuating push rod.

13. The double roller according to claim 11, wherein the directional-locking part (21) and the pivoting-blocking part are movable axially independently of one another.

14. The double roller according to claim 1, wherein centrally in relation to the actuating push rod, the running-wheel braking part has an adjusting screw for changing relative axial distance between the running-wheel braking part and the actuating push rod.

15. The double roller according to claim 14, wherein the adjusting screw is accommodated in a central hollow-cylinder portion of the running-wheel braking part having an opening beneath the adjusting screw to permit access to the adjusting screw.

16. A double roller with first and second running wheels disposed along a running-wheel axis and a hollow carrying housing extending between the running wheels, the carrying housing comprising a first carrying-housing part having a first closed end and a second carrying-housing part to form a housing interior, the running-wheel axis passing through the first carrying-housing part, wherein the first carrying-housing part is closed laterally toward the running wheels except for a through-passage for rotational-blocking engagement parts which are acted upon from the housing interior and wherein, in addition, a mounting pin is formed on the carrying housing and an actuating push rod is diplaceable in the mounting pin counter to spring force.

17. The double roller according to claim 16, wherein the first and second carrying-housing parts engage one inside the other near the running-wheel axis.

18. The double roller according to claim 16, wherein each carrying-housing part forms part of a running-wheel hub.

19. The double roller according to claim 16, wherein the first carrying-housing part contains chambers.

20. The double roller according to claim 16, wherein the second carrying-housing part has first and second through-holes connecting the housing interior to an area outside the second carrying-housing part.

21. The double roller according to claim 16, wherein the actuating push rod is biased into an uppermost position by a push-rod spring, and the push-rod spring rests on a base formed on the second carrying-housing part.

22. The double roller according to claim 21, wherein the second carrying-housing part is subjected to loading only by the push-rod spring.

23. A double roller with first and second running wheels and a carrying housing comprising a housing portion, wherein a mounting pin is formed on the carrying housing and an actuating push rod accommodated in the housing portion is displaceable in the mounting pin counter to spring force and interacts with a locking counter-part for locking the running wheels in at least one direction, and wherein, in addition; a running-wheel braking part with engagement parts is provided, for rotational blocking of the running wheels, wherein said running-wheel braking part is likewise actuated by the actuating push rod, wherein the running-wheel braking part is forced against the actuating push rod merely by spring force applied by an adjusting spring disposed beneath the actuating push rod and the running-wheel braking part to adjust the actuating push rod into an uppermost position.

24. The double roller according to claim 23, wherein the adjusting spring is supported on a housing-mounted base.

25. The double roller according to claim 24, wherein the housing-mounted base is formed beneath the running-wheel axis.

26. A roller comprising a running wheel, a running-wheel-axle body connected to the running wheel and a running-wheel hub connected to the running-wheel-axle body, an externally visible covering part being connected to the running-wheel-axle body at least by frictional fitting and, during use, the running-wheel hub rotates relative to the covering part, wherein the covering part is covered over by a transparent protective part.

27. Roller according to claim 26, wherein the protective part is disposed so as to rotate along with the running-wheel hub.

28. Roller according to claim 26, wherein starting from a radially inward direction, the covering part engages partially over the running-wheel hub.

29. Roller according to claim 26, wherein the protective part is latchingly held on the running-wheel hub.

30. A double roller with first and second running wheels disposed along a running-wheel axis and a hollow carrying housing extending between the running wheels, the carrying housing comprising a first carrying-housing part having a first closed end and a second carrying-housing part to form a housing interior, the running-wheel axis passing through the first carrying-housing part, wherein, in addition, a mounting pin is formed on the carrying housing and an actuating push rod is displaceable in the mounting pin counter to spring force, and wherein the second carrying-housing part has first and second through-holes connecting the housing interior to an area outside the second carrying-housing part, the first through-hole being aligned with an adjusting screw associated with the actuating push rod.

31. A double roller with first and second running wheels disposed along a running-wheel axis and a hollow carrying housing extending between the running wheels, the carrying housing comprising a first carrying-housing part having a first closed end and a second carrying-housing part to form a housing interior, the running-wheel axis passing through the first carrying-housing part, wherein, in addition, a mounting pin is formed on the carrying housing and an actuating push rod disposed in the first carrying-housing part is diplaceable in the mounting pin counter to spring force.

* * * * *